Patented June 13, 1933

1,913,561

UNITED STATES PATENT OFFICE

FERDINAND W. NITARDY, OF BROOKLYN, FRANTZ F. BERG, OF FLORAL PARK, AND PAUL GEORGI, OF FREEPORT, NEW YORK, ASSIGNORS TO E. R. SQUIBB & SONS, OF BROOKLYN, NEW YORK, A CORPORATION OF NEW YORK

PREPARATION OF AGAR-PETROLATUM COMPOSITIONS

No Drawing. Application filed November 10, 1931. Serial No. 574,220.

This invention relates to compositions containing substances which are soluble in hot water and set to form a jelly on cooling, and particularly to such compositions in which immiscible ingredients are combined with the jelly-forming substances.

It is the object of the invention to provide improved products including compositions containing jelly-forming substances and immiscible ingredients.

Another object of the invention is the provision of products including jelly-forming substances, particularly agar agar and oils such as petrolatum and emulsions thereof.

Another object of the invention is the provision of improved methods of combining jelly-forming substances and immiscible ingredients such as oils and emulsions thereof.

Among the jelly-forming substances which may be used are gelatine, pectin and agar agar, but others may be employed in similar compositions, more particularly with oily materials or emulsions. The invention is applicable to a wide variety of compositions, but it will be described more particularly with reference to compositions containing agar agar and oil emulsions, especially emulsions of petrolatum. As an example of the invention, a solution of agar agar is prepared by dissolving a suitable proportion thereof in boiling water. Simultaneously an emulsion of oil with a solution of a suitable gum such as Acacia is prepared by adding the oil to and emulsifying it with the gum solution while the latter is maintained at a relatively high temperature, for example, about 60° C. When a suitable emulsion is obtained, it is transferred to the hot solution of agar agar and the mixture is stirred vigorously for a short time to ensure uniformity. During the stirring the temperature of the mixture does not decrease appreciably and may be maintained, if desired, by circulation of steam or otherwise. The stirring is then stopped, and the hot mixture is strained through a sieve (about 40 mesh, for example) to remove any extraneous or undissolved material. The mixture is then left undisturbed for about forty-eight hours. During this time it cools to room temperature and becomes a soft mush of somewhat curdy appearance.

The cold mush is then mixed with a strained solution of a suitable gum such as Acacia in water, containing also an additional amount of oil and materials such as glycerin and flavoring ingredients. This mixture is circulated through a strainer (about 40 mesh) to remove any undissolved particles and is then passed through an homogenizer at high pressure, for example, 2,500 pounds per square inch. The resulting product is a smooth, glossy white, uniform emulsion which flows freely and is admirably adapted for its intended purpose.

Instead of emulsifying the oil separately and adding the emulsion to the concentrated hot agar solution, the solution itself may be used as the emulsifying agent, or a mixture or oil and another emulsifying gum such as Acacia may be added, or, oil and Acacia may be added separately. However, for large scale production it is more satisfactory to add a finished emulsion, especially when highly concentrated solutions of a jelling material are used, as a tendency of the mixture to set into a jell during the emulsification process may cause operating difficulties. The important feature is to disperse oil globules through the hot solution of the jelling material so that the solution represents, instead of a homogeneous mass, a sponge-like structure in which films of the jelling material in solution are separated from each other by dispersed oil globules. Cooling of such a mixture causes the cooled material to be a mush instead of a firm, tough jelly.

The special advantages of the method are the elimination of expensive stirring for long periods, particularly during cooling of the agar agar solution and the possibility of homogenizing at high pressure which permits more efficient and satisfactory operation. In the present method it is unnecessary to stir the agar agar solution during the cooling thereof to room temperature and the subsequent operations are conducted at room temperature.

The proportions of the various ingredients can be varied widely. The emulsion should contain in general about fifty per cent of oil, but the proportion of oil is not critical and the invention does not depend thereon. The proportion of agar agar should be such preferably that if the water solution were cooled a firm jelly would be formed. The product may contain more than one per cent of agar agar. Such a product has marked therapeutic advantages. However, lower proportions of agar agar can be employed, the amount introduced depending upon the proportion desired in the product.

The following will serve as a specific example of the preferred procedure and desirable proportions of the ingredients to produce a satisfactory product:

In a steam-jacketed kettle heat under constant stirring:

| | |
|---|---|
| Agar agar flakes | 23.275 lbs. |
| Sodium benzoate | .75 lbs. |
| Water | 20. gals. |
| Glycerin | 5. gals. | until the agar is dissolved.

Simultaneously in a steam-jacketed can prepare an emulsion from a strained solution of:

| | |
|---|---|
| Acacia gum granular | 27.75 lbs. |
| Sodium benzoate | .375 lbs. |
| Water | 13.125 gals. |
| and | |
| Liquid petrolatum | 50. gals. |

While the liquid petrolatum is being added to the Acacia solution, steam is circulating through the jacket of the can in order to heat the emulsion to about 60° C. As soon as a uniform emulsion is obtained it is transferred to the steam-jacketed kettle and mixed under stirring with the hot agar solution. Then the stirrer is shut off and the hot mixture by means of a pump is drawn from the kettle and strained through a 40 mesh strainer into two 50-gallon tin-lined copper cans, in which it is left undisturbed for forty-eight hours. The so obtained agar mush is soft and smooth, although of somewhat curdy appearance. It is transferred to a mixing tank and mixed with a strained solution of—

| | |
|---|---|
| Acacia gum granular | 27.75 lbs. |
| Sodium Benzoate | .375 lbs. |
| Water | 13.125 gals. |
| and | |
| Liquid petrolatum | 37.5 gals. |
| Glycerin | 9.18 gals. |
| Water, quantity sufficient to make a total of | 175. gals. |
| Flavoring materials | 1. pt. |

The mixture is circulated through a 40 mesh strainer and homogenized with 2500 lbs. pressure.

The foregoing example is merely illustrative of the invention, which resides more particularly in the method and product involving the mixing of a hot solution of jell-forming substances with an immiscible ingredient such as oil at relatively high temperature, and the cooling of the mixture while it is quiescent, that is to say, avoiding stirring during the cooling of the mixture to room temperature.

The same method may be used to incorporate quantities of other materials that will jell, such as gelatin or pectin, into preparations which will be liquid and free flowing. The ingredients selected and the proportions thereof will vary widely depending upon the desired characteristics and/or therapeutic properties of the products.

Various changes may be made in the details of procedure and the character and proportions of the ingredients employed without departing from the invention or sacrificing any of the advantages thereof.

We claim:

1. In the method of preparing oil emulsions containing agar agar, the steps of dissolving the agar agar in hot water, introducing and mixing therewith while hot an emulsion of oil and permitting the mixture to cool in a quiescent condition.

2. In the method of preparing liquid petrolatum emulsions containing agar agar, the steps of dissolving agar agar in hot water, introducing and mixing therewith while hot emulsified liquid petrolatum and permitting the mixture to cool in a quiescent condition.

3. In the method of preparing oil emulsions containing materials which would normally form a jelly, the steps of dissolving the jell-forming material in hot water, dispersing oil in the form of minute globules into the solution while hot, and permitting the mixture to cool in a quiescent condition.

4. In the method of preparing oil emulsions containing agar agar, the steps of dissolving the agar agar in hot water, adding to the solution while hot a mixture of powdered Acacia and oil emulsifying and permitting the mixture to cool in a quiescent condition.

5. In the method of preparing oil emulsions containing agar agar, the steps of dissolving agar agar in hot water, introducing an emulsion of oil and water to the hot agar agar solution, permitting the mixture to cool in a quiescent condition, adding an additional amount of oil emulsion to the cold mush resulting from the preceding steps and homogenizing the mixture.

6. In the method of preparing oil emulsions containing agar agar, the steps of dissolving agar agar in hot water in proportions required to normally form a firm jelly, introducing an emulsion of oil and water to the hot agar agar solution and permitting the mixture to cool in a quiescent condition.

In testimony whereof we affix our signatures.

FERDINAND W. NITARDY.
FRANTZ F. BERG.
PAUL GEORGI.